March 12, 1968

D. G. CHADWICK 3,372,586

PRECIPITATION MEASUREMENT GAUGE

Filed June 23, 1965

INVENTOR.
DUANE G. CHADWICK

BY *Mallinckrodt*
*Mallinckrodt*

ATTORNEYS

March 12, 1968  D. G. CHADWICK  3,372,586
PRECIPITATION MEASUREMENT GAUGE
Filed June 23, 1965  3 Sheets-Sheet 2

INVENTOR.
DUANE G. CHADWICK
BY *Mallinckrodt and Mallinckrodt*
ATTORNEYS

March 12, 1968  D. G. CHADWICK  3,372,586
PRECIPITATION MEASUREMENT GAUGE
Filed June 23, 1965  3 Sheets-Sheet 3
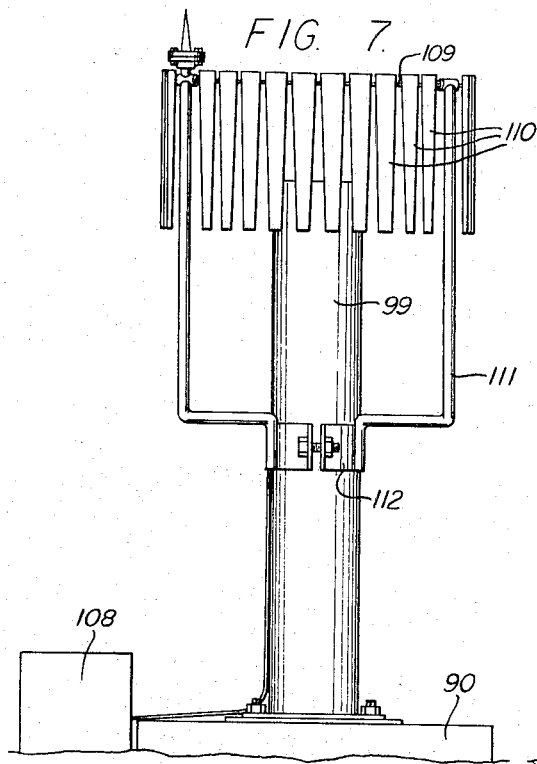
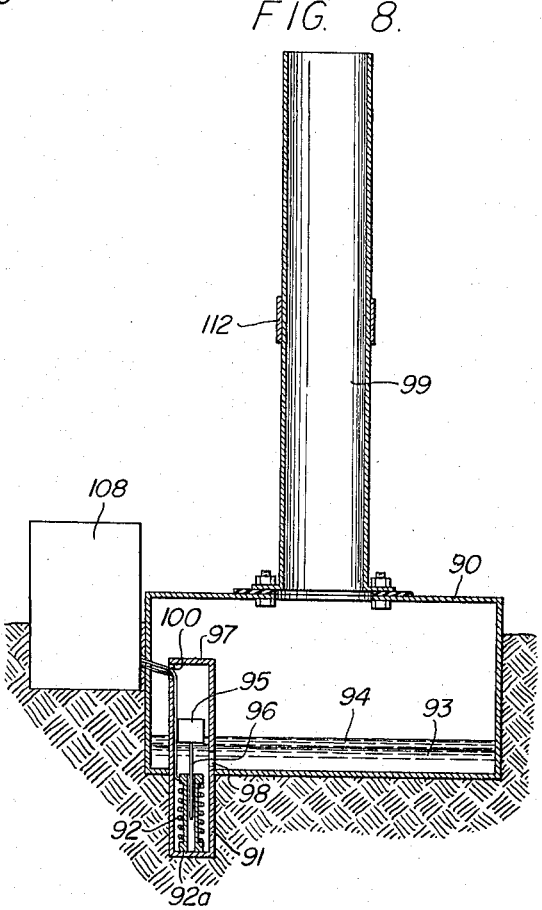
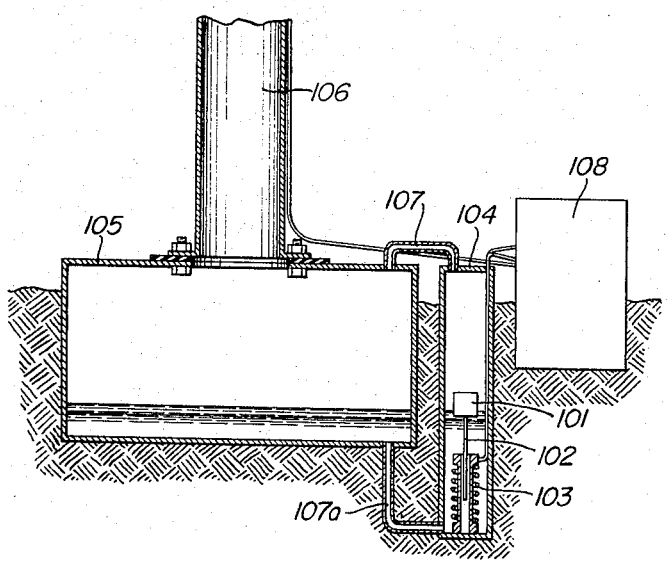
INVENTOR.
DUANE G. CHADWICK
BY *Mallinckrodt and Mallinckrodt*
ATTORNEYS United States Patent Office
3,372,586
Patented Mar. 12, 1968

3,372,586
PRECIPITATION MEASUREMENT GAUGE
Duane G. Chadwick, Logan, Utah, assignor to Thiokol Chemical Corporation, Bristol, Pa., a corporation of Delaware
Filed June 23, 1965, Ser. No. 466,404
8 Claims. (Cl. 73—171)

ABSTRACT OF THE DISCLOSURE

A precipitation gauge for telemetering water level information. A receiving vessel is supported by oppositely acting springs within a housing and a core is carried by the housing and is movable within an electrical coil such that temperature changes and friction do not significantly affect a transmitted signal indicative of the weight of the receiving vessel and varied in accordance with the position of the core.

*Brief description of the invention*

Figure 1:
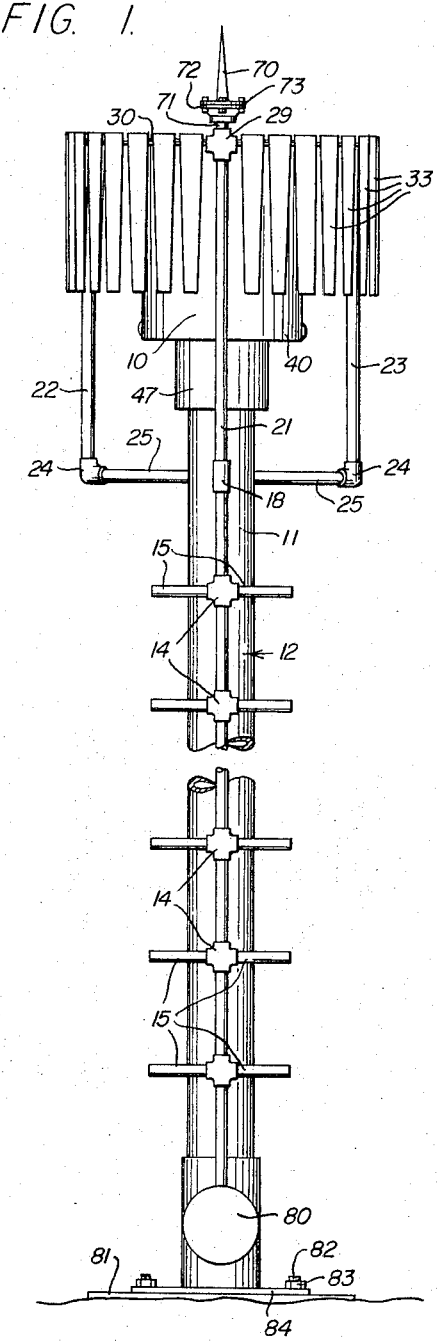

This invention relates to precipitation gauges and particularly to the type that are commonly used in rugged, mountainous terrain to catch rain or snow, for the purpose of enabling a record to be made of total accumulated precipitation over a period of time. Depending upon the accessibility of the gauge, the period of time between readings may vary from as often as hourly, daily, or biweekly, to once every three months or more. Because of specific knowledge that can be gained with respect to the amount of precipitation left by a particular storm or series of storms, for example, the frequent readings are more desirable.

Gauges heretofore used in mountainous terrain have required a marked staff or tube as a direct-reading indicator of the depth of water in a calibrated receiving vessel, or an observer has been used to periodically weigh the receiving vessel and its contents. In either case the observer must go to the gauge in order to make the reading. Both types of previously used gauges are difficult to read in rugged terrain and the previously known direct-reading gauges are subject to erroneous readings, since they may become partially filled with unmelted snow.

In rugged terrain where snowfall is heavy, frequent visits are not practical and in the past much more expensive and unreliable, continuous recorders have been employed.

Gauge supports have been generally of either truss or platform construction, difficult to assemble in remote areas and permitting snow accumulations thereon that frequently cover the opening to the receiving vessel of the gauge. This latter condition results in erroneous readings. For example, with continuous recording type gauges, the recorded time of snowfall may be displaced, since the snowfall may not be immediately desposited in the receiver vessel, and, with direct reading gauges, the indicated catch may be grossly erroneous.

It is a principal object of the present invention to provide a precipitation gauge that will accurately catch and measure precipitation and that will transmit to remote receiving instruments a signal indicative of the amount caught, whereby measurements can be recorded without the necessity for closely approaching the gauge and can, therefore, be conveniently taken on a frequent basis.

It is also an object to provide such a gauge that can be used with or without special support structure, and a support structure that is readily pre-assembled, or assembled in remote areas; that will withstand the heavy snowfalls occurring in mountain regions; that will fully protect the component parts of the gauge; and that will eliminate the possibility of snow accumulating to "bridge" or "cap-over" the receiving vessel of the gauge.

In accomplishing the foregoing objects, I utilize as principal features of the invention a receiving vessel and a core which has its position relative to a coil determined by the accumulation of precipitation in the receiving vessel. The core is positioned in such a manner that there is no significant frictional resistance to its movement, and the position of the core relative to the fixed coil is determinative of a signal transmitted to a signal receiver located, for example, in an airplane or ground vehicle that is moved into the vicinity of the transmitter.

There are shown in the accompanying drawings, specific embodiments of the invention representing what are presently regarded as the best modes of carrying out the generic concepts in actual practice. From the detailed description of these presently preferred forms of the invention, other more specific objects and features will become apparent.

Figure 3:
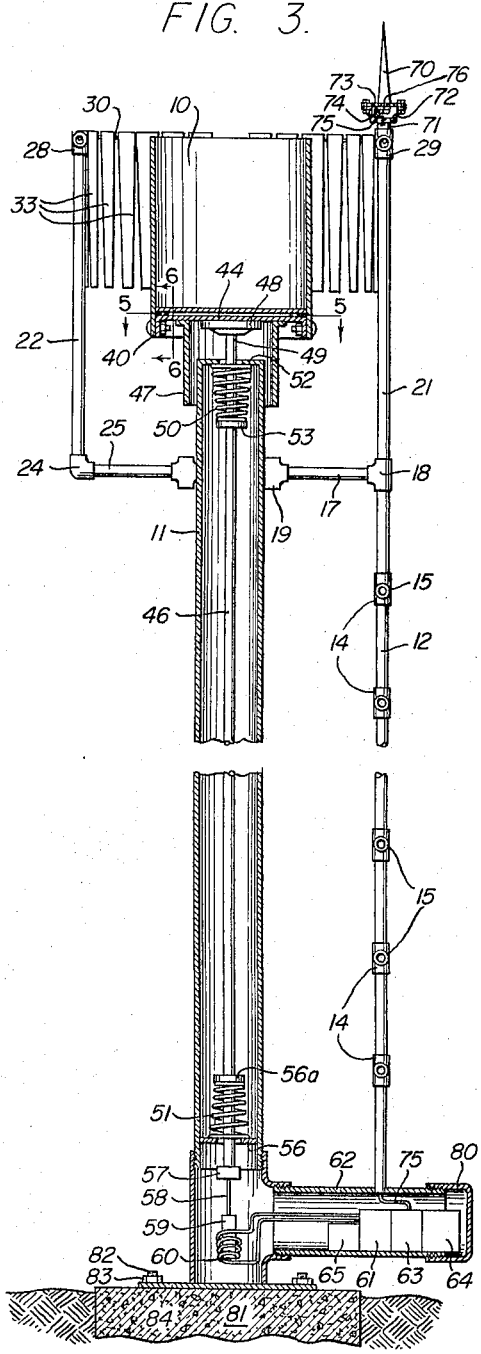
Figure 2:
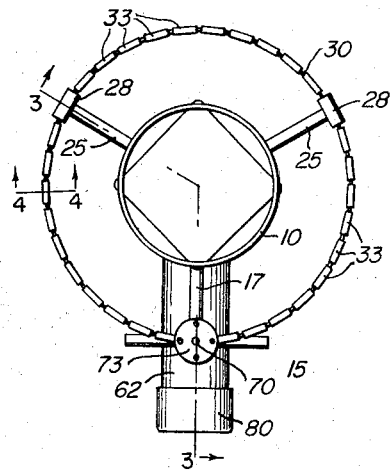
Figure 5:
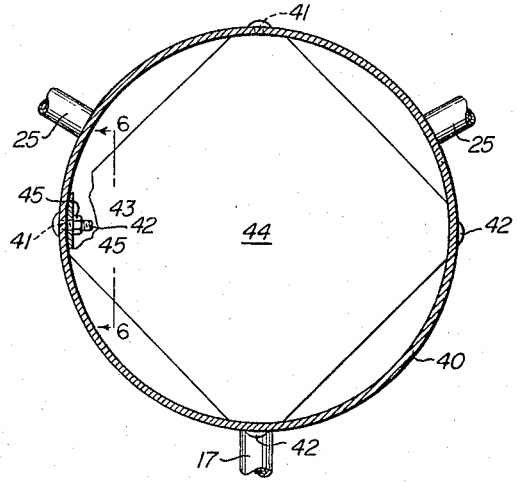
Figure 4:
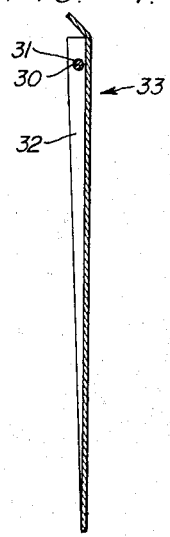
Figure 6:
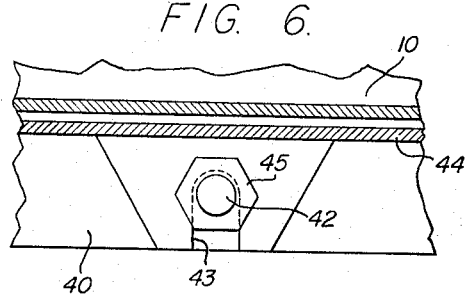

In the drawings:

FIG. 1 represents a front elevation of a gauge conforming to the invention;

FIG. 2, a top plan view;

FIG. 3, a vertical section view taken on line 3—3 of FIG. 2;

FIG. 4, a vertical section view taken on line 4—4 of FIG. 2, and showing a typical slat construction;

FIG. 5, a horizontal section taken on line 5—5 of FIG. 3, showing the mounting of the precipitation receiving vessel;

FIG. 6, a vertical section taken on line 6—6 of FIG. 3;

FIG. 7, a front elevation view of another embodiment of gauge conforming to the invention;

FIG. 8, a vertical section taken centrally through the gauge of FIG. 7; and

FIG. 9, a similar view of still another form of gauge.

Referring now the drawings:

In the embodiment illustrated in FIGS. 1–6, the gauge consists of a precipitation receiving vessel 10 carried by a vertically positioned, tubular housing 11 of smaller diameter than the vessel. Housing 11 may be a standard pipe section, and a tubular pole 12, which may also be constructed of standard pipe sections, extends parallel to the tubular housing 11.

Pole 12, has T's 14 spaced along its length and pipes 15, threadedly connected to T's 14, extend out from pole 12 at opposite sides thereof to serve as ladder rungs that afford easy access to the receiver vessel 10. Such access may be necessary in checking the operation of the gauge, making repairs, or performing necessary preventive maintenance operations.

Arm 17 is threaded into a T 18, at the top of pole 12, and is similarly connected to a fitting 19 fixed to housing 11. Extending upwardly from T 18 is a vertical support arm 21 for a windshield. Additional vertical support arms 22 and 23 are similarly connected by T's 24 to horizontal support arms 25. These arms radiate outwardly from fitting 19 and at their upper ends arms 22 and 23 each carry a T 28, while a four-way connector 29 is mounted on the vertical support arm 21.

The usual windshield ring 30 passes through T's 28 and connector 29 and surrounds the upper end of receiver vessel 10. The ring also passes through holes 31 in inturned flanges 32 of slats 33 to loosely mount the slats on the ring. The slats are positioned completely around the receiver vessel to serve as wind deflectors, and their freely pivoted mounting helps to prevent bridging of snow and ice over the receiver vessel.

Since the support housing is of smaller diameter than the receiving vessel, the only structure surrounding the receiving vessel on which snow can accumulate to bridge or cap- over the receiver vessel is the windshield ring. This is not likely to occur because of the small size and shape of the ring and because, should such an accumulation occur, it would be quickly broken up by the wind-blown movement of slats 33.

Receiver vessel 10 has a downwardly extending skirt 40 with four equally spaced holes 41 formed therethrough. Bolts 42 extend through holes 41 and through vertical slots 43 formed in downturned corners of a rectangular plate 44. Nuts 45 threaded on bolts 42 hold skirt 40 and plate 44 tightly in their set relative positions. Since the bolts are slidable within slots 43, after nuts 45 are loosened, the upwardly extending receiving vessel can be easily adjusted to be vertically positioned on plate 44 with its bottom level, even though shaft 46, which supports the plate, may not be in an exactly vertical position.

Another skirt 47, fixed to the bottom of plate 44 by welding, or the like, extends downwardly around the open top of housing 11 to prevent water or snow being blown into the housing. Skirt 47 does not, however, engage housing 11.

A connector plate 48, also affixed to the bottom of plate 44, has a threaded opening that connects correspondingly threaded shaft 46 and plate 44.

Shaft 46, and therefore the receiver vessel 10, are supported by a tension spring 50 and a compression spring 51, positioned at opposite ends of housing 11.

Spring 50 is welded or otherwise securely fastened to shoulder 52 of housing 11 and to a collar 53, which is keyed to shaft 46, such that the spring tends to bias upwardly the shaft and the receiver vessel carried thereby. Spring 51 is welded or otherwise fastened to shoulder 56 within housing 11 and to collar 56a keyed to shaft 46, to also raise the shaft and receiving vessel. Springs 50 and 51 are selected to hold shaft 46 and receiving vessel 10 in a suspended position, even when the vessel is filled with water. The springs are desirably of tapered configuration, as shown, to give the suspended assembly lateral stability.

A cap 57 is threaded on the lower end of shaft 46 and carries a wire 58 fixed at its other end to a metal block 59, which serves as a magnetic core for coil 60. Movement of the receiving vessel and shaft 46 also moves core 59 with respect to the coil and, if the transmitter 61 connected to the coil is operating, changes the signal transmitted. Transmitter 61 can be any conventional transmitter small enough to fit in a nipple 62 connected to housing 11. A modulator 63 is also housed within nipple 62 to modulate the transmitted signal and batteries 64 provide the power source for the transmitter. Since it is not desirable to have the unit continuously transmitting a receiver 65 is provided to turn the transmitter on and off, as desired.

Precipitation records can thus be made as frequently as desired, by land vehicle or airplane, for example, without closely approaching the gauge itself. The receiving station need only be equipped with a transmitter for actuating the receiver at the gauge to start data transmission, a receiver for the transmitted data signal, and a means for comparing the received data signal with a known zero reading. These components, as well as the batteries, receiver, transmitter, and modulator, at the gauge are all well known, and per-se form no part of the present invention, except insofar as they co-operate with the disclosed gauge and gauge support structure.

The necessary antenna 70 for the transmitter and receiver is positioned on top of four-way connector 29. A short nipple 71 is threaded at one end into connector 29 and at its other end into the bottom of a dish-shaped base plate 72. An insulator plate 73 is bolted on top of plate 72 and the antenna extends through the insulator plate and is held in position by nuts 74, threaded on the antenna at opposite sides of the plate.

Antenna lead wire 75 is connected to a solder lug 76 that surrounds the antenna and is held in position by the lower nut 74. Wire 75 extends downwardly through vertical arm 12, T 18, and the pipe 12 which is fixed to and opens into nipple 62. and from there to transmitter 61 and receiver 65. The outside shield of the antenna wire is suitably grounded through a connecting wire (not shown) attached, for example, to plate 72. The windshield thus serves as a ground plane to the antenna, greatly increasing the efficiency of the radiated electro-magnetic waves.

A cap 80, threaded on the end of nipple 62, affords easy access to the batteries, transmitter, modulator, receiver, and coil, and protects them from the elements, vandals, etc.

Although it should be apparent that other means can be employed to support the housing, a preferred installation will include the cement block 81 secured in the ground and having upright bolts 82 and nuts 83 to firmly hold a base plate 84 fixed at the lower end of housing 11 in position.

In operation, the weight of the volume of precipitation in receiving vessel 10 determines the position of the block, or core, 59. The signal produced by transmitter 61 is dependent on the position of core 59, and the transmitter will operate whenever receiver 65 has been triggered from a remote receiving station.

The oppositely positioned springs 50 and 51 tend to dampen each other and give vertical stability to the assembly. Furthermore, the springs compensate for temperature changes, and therefore tend to maintain the suspended assembly in a constant position that is significantly varied only by weight changes in vessel 10.

If temperature changes cause spring 50 to expand, for example, spring 51 will also expand, thus operating to hold the suspended assembly in the same fixed position. The same counteracting will occur should temperature changes cause the springs to contract.

Similarly, the use of a housing 11 and shaft 46 provides an additional temperature compensation that will insure movement of the core only in response to an increase in weight in vessel 10. Thus, temperature changes tending to elongate housing 11 to raise core 59 are compensated for by a simultaneous and substantially equal elongation of shaft 46 tending to lower the core.

In the embodiment of the invention shown in FIG. 7, a precipitation-receiving vessel 90 may be anchored by partially burying it in the ground. A housing 91 extends below the vessel 90 and contains the coil 92, the coil being held in place by insulators 92a attached to the wall of housing 91. Vessel 90 is partially filled with an anti-freeze solution 93 that is covered with a layer of light oil 94 to retard evaporation.

A float 95 rests on the oil and carries a magnetic core 96 that extends into coil 92. The float reciprocates within an interior housing 97 that is secured to the bottom of vessel 90 and that has ports 98 through which the anti-freeze and oil can pass into housing 97.

An open standpipe 99 extends above vessel 90 and provides an entrance for precipitation to the vessel. The standpipe is offset from the position of float 95 and housings 91 and 97 so that precipitation entering through the standpipe will not directly affect the position of the core 96 within coil 92. If the precipitation is in liquid form it penetrates the oil and mixes with the anti-freeze to vary the level of the liquid acting on the float, or, if it is in the form of snow, it rests on the layer of oil, thereby displacing oil and anti-freeze into housing 97 through ports 98 to vary the float level.

A vent hole 100 in the upper end of housing 97 maintains the same atmospheric pressure inside housing 97 as is present within vessel 90.

In FIG. 9, there is shown another embodiment of gauge very similar to that of FIGS. 7 and 8. In this embodiment however, the float 101, core 102, and coil 103 are all positioned in a housing 104 that is separate from the precipitation receiving vessel 105. Vessel 105 is similar to vessel 90, previously described, and includes a standpipe 106 that provides an entrance for precipitation to the vessel.

Housing 104 and vessel 105 are interconnected at their tops and bottoms by tubes 107 and 107a respectively, so that the same atmospheric conditions and liquid levels will be maintained in both the housing and the vessel.

In both the embodiments shown in FIGS. 7 and 9, the position of the core relative to the coil is determinative of the signal transmitted from the transmitter located in a separate housing 108 positioned adjacent the precipitation-receiving vessel.

Housing 108 contains a radio receiver, adapted to be responsive to a signal transmitted from a remote recording station, a radio transmitter actuated by said receiver, a modulator, and a battery, all as has been previously disclosed, for transmitting signals indicative of the position of the core within the coil.

These embodiments also each include the same type windshield disclosed in connection with the gauge of FIGS. 1-6. The windshield, including a ring 109 that passes through slats 110, is carried by arms 111 radiating outwardly from a collar 112 fixed to the top of the standpipes. As with the previously disclosed windshield, the antenna is mounted to extend upwardly from the ring and the windshield serves as a ground plane to the antenna to increase the efficiency of the radiated electro-magnetic waves.

In the embodiment shown in FIGS. 1-6 as well as the embodiments shown in FIGS. 7, 8, and 9, a highly accurate, temperature compensating, and substantially friction free gauge is provided for measuring the amount of precipitation and for transmitting a signal indicative of the volume of accumulated precpitation to a remote receiver.

Whereas there is here illustrated and specifically described a certain preferred construction of apparatus which is presently regarded as the best mode of carrying out the invention, it should be understood that various changes may be made and other constructions adopted without departing from the inventive subject matter particularly pointed out and claimed herebelow.

I claim:

1. A precipitation gauge, comprising a precipitation-receiving vessel; a housing; a pair of tapered coiled springs in said housing supporting said precipitation-receiving vessel; a shaft connected to the precipitation-receiving vessel; means mounting one of said springs to bias said vessel in one direction, said means comprising a collar fixed to said shaft adjacent to one end thereof, the said one spring being mounted with its larger coil fixed to said housing and its smaller coil fixed to said collar; means mounting the other of said springs to bias said vessel in the opposite direction, said means comprising a second collar fixed to said shaft adjacent to the other end thereof, said other spring being mounted with its larger coil fixed to said housing and its smaller coil fixed to said second collar; said springs being thereby mounted in opposition to each other and being mutually temperature compensating; and signal-producing means responsive to and indicative of the position fo the precipitation-receiving vessel.

2. A precipitation gauge according to claim 1, further including a windshield carried by said housing to protect the precipitation receiving vessel from wind, and to prevent bridging of said vessel by snow accumulation, and means connecting said antenna to said windshield whereby the windshield forms a ground plane to the antenna.

3. A precipitation gauge according to claim 1, wherein the means connecting said shaft to the precipitation-receiving vessel includes adjustment means, whereby the position of said vessel can be adjusted relative to said shaft.

4. A precipitation gauge according to claim 3, wherein the adjustment means comprises a skirt depending from the precipitation receiving vessel in spaced surrounding relationship to the housing; spaced holes through the skirt; a plate fixed to the shaft; vertical, elongate slots in said plate, and bolt means extending through the holes and the vertical, elongate slots, said bolt means providing means whereby the relative position of said shaft and said precipitation receiving vessel can be fixed.

5. A precipitation gauge according to claim 1, wherein the precipitation receiving vessel is larger than said housing, to thereby extend outwardly beyond the housing.

6. A precipitation gauge according to claim 1, further including a plurality of arms carried by the housing; and a windshield carried by said arms, said windshield comprising a pipe frame surrounding the precipitaton-receiving vessel, and spaced slats loosely carried by said frame.

7. A precipitation gauge comprising a cylindrical precipitation-receiving vessel having one open-end; a support housing for said receiving vessel, means in the housing mounting said vessel for vertical movement relative to said housing; said support housing comprising a pipe of smaller diameter than said precipitation gauge positioned beneath the support housing; a circular windshield including a ring carried by said support housing and surrounding the open end of said precipitation-receiving vessel and vertically extending, freely pivotable slats carried by the ring and substantially enclosing said vessel; means in the housing responsive to and indicative of the vertical position of the vessel; and a ladder fixed to and extending beneath said ring and extending parallel with the support housing whereby said support housing and said ladder are mutually supporting.

8. A precipitation gauge for remote or inaccessible locations, comprising a precipitation-receiving vessel; pressure-responsive means supporting said vessel; an electrical coil; a magnetic core within said coil and mounted for in and out movement relative thereto; means coupling said core to said pressure-responsive means for movement by said pressure-responsive means in proportion to changes in pressure imparted thereto by said precipitation-receiving vessel from time to time; and electrical signalling means in circuit with said coil, so as to produce signals which vary in accordance with variations of position of said core within said coil.

References Cited
UNITED STATES PATENTS

| | | | |
|---|---|---|---|
| 374,759 | 12/1887 | Segog | 177—232 |
| 984,264 | 2/1911 | Colson | 177—232 |
| 1,031,699 | 7/1912 | Emanuel | 177—228 X |
| 2,081,367 | 5/1937 | Nicolson | 177—210 |
| 2,287,786 | 6/1942 | Diamond et al. | 73—171 |
| 2,468,692 | 4/1949 | Stevens | 73—171 X |
| 2,497,759 | 2/1950 | Cappleman | 73—171 |
| 2,623,143 | 12/1952 | Laury | 73—313 X |
| 2,629,826 | 2/1953 | McIlvaine | 250—27 |
| 2,735,298 | 2/1956 | Dispenza | 73—171 |
| 2,773,386 | 12/1956 | Swickner | 73—313 |
| 2,844,959 | 7/1958 | Gross | 73—141 |
| 2,954,690 | 10/1960 | Dickinson | 73—171 |

OTHER REFERENCES

Telemetry Transducer Handbook, volume 1, July 1961, Flight Control Laboratory, Wright-Patterson Air Force Base, Ohio, pages 1-5 relied on.

RICHARD C. QUEISSER, *Primary Examiner*.

J. J. SMITH, J. W. MYRACLE, *Assistant Examiners*.